United States Patent
Lukac et al.

(10) Patent No.: US 6,412,260 B1
(45) Date of Patent: Jul. 2, 2002

(54) DIRECT DRIVE SYSTEM WITH A FLYWHEEL FOR AN AGRICULTURAL COMBINE

(75) Inventors: John Bradley Lukac, Bettendorf; Xitian Fang, Davenport, both of IA (US); Joshua J. Wolters, Geneseo, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/696,459

(22) Filed: Oct. 25, 2000

(51) Int. Cl.[7] .............................................. A01D 45/00
(52) U.S. Cl. ...................... 56/327.1; 460/142
(58) Field of Search .............................. 56/16.4 R, 122, 56/341, 343, 432, 436, 437, 11.1, 11.6, 11.8, 14.6, 327.1; 460/1, 119, 16, 20; 415/90; 74/572–74

(56) References Cited

U.S. PATENT DOCUMENTS

| | | | |
|---|---|---|---|
| 3,810,512 A | 5/1974 | Porter | |
| 4,114,762 A | * 9/1978 | Beal et al. | 209/78 |
| 4,535,788 A | 8/1985 | Rowland-Hill et al. | |
| 4,570,426 A | 2/1986 | Bettencourt et al. | |
| 5,316,519 A | 5/1994 | Johnson | |
| 5,462,402 A | * 10/1995 | Bakholdin et al. | 415/90 |
| 5,480,353 A | 1/1996 | Garza, Jr. | |
| 5,752,374 A | * 5/1998 | Allworden et al. | 56/341 |
| 5,995,895 A | * 11/1999 | Watt et al. | 701/50 |
| 6,145,291 A | * 11/2000 | Jarmain | 56/330 |

* cited by examiner

*Primary Examiner*—Robert E. Pezzuto
(74) *Attorney, Agent, or Firm*—John William Stader; Larry W. Miller

(57) ABSTRACT

A drive system for the sieves in an agricultural combine that includes a flywheel for improving the fatigue life of the sieves. The flywheel minimizes damaging accelerations in the sieves that result from speed variations in the drive shaft. A hydraulic motor is also provided for directly driving the sieves without the use of belts.

7 Claims, 4 Drawing Sheets

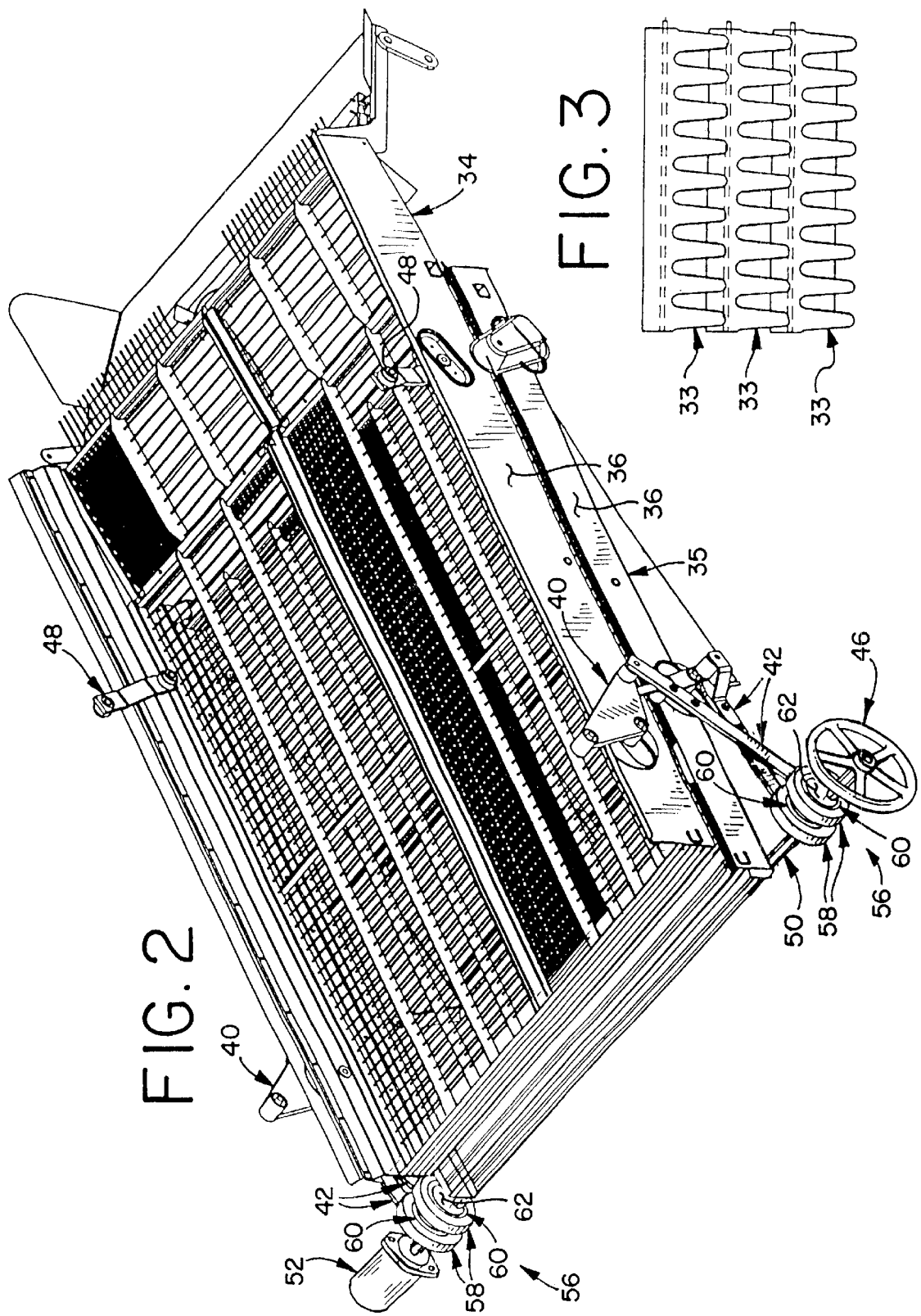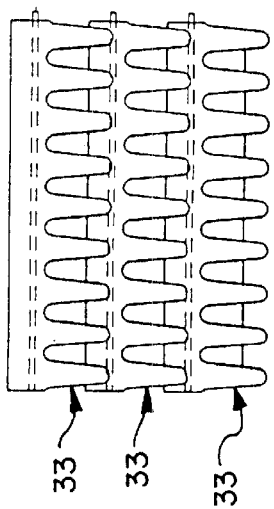

DIRECT DRIVE SYSTEM WITH A FLYWHEEL FOR AN AGRICULTURAL COMBINE

FIELD OF THE INVENTION

The present invention relates generally to agricultural combines. It relates particularly to the sieves.

BACKGROUND OF THE INVENTION

An agricultural combine is a common and well-known machine for harvesting crop materials. Agricultural combines are available in various designs and models to perform the basic functions of reaping crop materials from a crop field, separating the grain from the non-grain crop materials, and discarding the non-grain crop materials back onto the crop field.

A typical combine includes a crop harvesting apparatus, or header, which reaps ripened crop plants from the crop field. The header then feeds the crop materials rearwardly to a threshing apparatus. One type of threshing apparatus that is well-known to those skilled in the art is a rotary thresher. In such a system, the crop materials are introduced to the front end of a rotor assembly, which is oriented longitudinally within the combine body with the rear end positioned angularly upwards from the front end. The crop materials are then threshed in the annular space between a rotating rotor and the inside of a rotor housing.

Along the exterior of the rotor is a series of rasp bars which repeatedly, but gently, strike the crop materials as they spiral through the annular space between the rotor and rotor housing. The rasp bars also cooperate with spiral vanes along the interior of the rotor housing so that the crop materials feed rearward through the rotor assembly. As the crop materials feed through the rotor assembly, the fine materials are separated from the course materials. Typically, the fine materials include grain, partial grain heads, and broken pieces of crop stalks; while the course materials include crop stalks, leaves, and empty grain heads. The unwanted course materials continue their rearward travel through the rotor assembly and are discharged out from the rotor assembly's rear end. On the other hand, the fine materials pass through openings in the concave and grate which are positioned along the bottom side of the rotor housing.

The fine materials that pass from the rotor assembly are then further separated by a series of moving sieves. The sieves move in a constant back-and-forth motion, with the individual sieves generally moving in opposite directions to each other. Typically, a cleaning fan is used to blow forced air up through the sieve vanes so that the lighter fine materials are discharged from the rear end of the sieves. The heavier grain, on the other hand, passes through the sieve vanes and falls to the bottom of the combine body. The grain is then directed to an onboard grain bin through an augering system.

Generally, the drive system for the sieves is mechanically powered by the combine engine through a belt and pulley system. The combine engine usually also powers other moving components through either separate belts or, in some cases, through the same belt that drives the sieves. The drive ratio for the sieves is typically fixed by the diameters of the pulleys so that the moving speed of the sieves is directly proportional to the engine speed.

One problem with these belt drive systems is the durability of the belts. Frequently, the belts of a combine wear out and break during combining operations. This situation can be costly to the farmer, who is usually under pressure to harvest the crops during a limited optimal time period. Many times the belt drive systems in a combine become overly complex because of the large number of components that must be powered. Often, this system of multiple belts is so confusing that farmers find it difficult to quickly replace a broken belt with a new one.

Another problem is the inability to separately adjust the moving speed of the sieves. The moving speed of the sieves can have a significant impact on the performance of the sieves in separating grain from the fine materials. The optimal moving speed of the sieves can vary depending on a variety of factors, including the type of crop being harvested, the yield of the crop, and the particular combine settings being used. However, in the belt drive systems described, manufacturers usually choose a medium drive ratio that will provide a sieve moving speed that is considered acceptable for a broad range of conditions.

One problem encountered in developing new drive systems for the sieves is related to the high accelerations that can occur in the sieves. As previously explained, the sieves move in a constant, reciprocating motion, with about 265 back-and-forth cycles per minute being a common speed for the sieves. Thus, during the lifetime of a combine the sieves can experience as many as 60 million cycles. This constant cycling of the sieves can cause a variety of fatigue failures in the sieves, such as failures in the drive system joints and the welded seams of the side frames.

As is well-understood by those skilled in the art, changes in the travel speed, also referred to as accelerations, of the sieves contribute primarily to these fatigue failures. Therefore, in order to minimize stress on the sieves, the sieves preferably should travel smoothly between their backward and forward positions, with consistent or uniform speed changes. Of course, a certain amount of speed changes are necessary to accomplish the directional changes of the sieves. As a result of these directional speed changes, the drive shaft experiences a sinusoidal torque variation as it rotates and drives the sieves. Ideally, this sinusoidal torque curve should be smooth with a minimized amplitude.

Accelerations in the sieves, however, also occur due to other torque variations in the sieve's drive system. Depending on the characteristics of the drive system, these torque and speed variations can become high frequency vibrations that contribute significantly to fatigue failures in the sieves. These vibrations can be seen in the sinusoidal torque curve of the drive shaft as a higher frequency noise that can greatly exaggerate the overall amplitude of torque variations caused by directional speed changes. In the belt drive systems previously described, variations in the drive shaft speed are minimized by the high inertia associated with these systems. These systems inherently have high inertia because the sieve's drive system is mechanically connected to a number of other rotating components in the combine through belts and pulleys. The mechanical connection in these systems between several rotating components tends to have a flywheel effect that smoothes out the drive torque variations by minimizing drive shaft speed variations. However, in other drive systems where multiple belts and pulleys are not used, the inertia of the drive system can be relatively small. In these drive systems, therefore, torque and speed variations can result in greater accelerations in the sieves than usually occurs in belt drive systems.

BRIEF SUMMARY OF THE INVENTION

Accordingly, it is an object of the invention to provide a drive system that minimizes accelerations in the sieves.

It is another object to provide a drive system including a flywheel which acts to minimize accelerations in the sieves.

It is a further object of the invention to provide a hydraulic motor for directly driving the sieves without using belts and pulleys.

The drive system for the sieves in the present invention includes a pivot member that is pivotally attached to one of the sieves and to a connecting arm. The connecting arm is attached at the other end to an oscillation mechanism which provides the sieves with a back-and-forth, reciprocating movement. The oscillation mechanism is driven by a drive shaft which is directly driven by a hydraulic motor. In order to minimize torque and speed variations in the drive system, a flywheel is provided.

BRIEF DESCRIPTION OF SEVERAL VIEWS OF THE DRAWINGS

The invention, including its construction and method of operation, is illustrated more or less diagrammatically in the drawings, in which:

FIG. 2 is a perspective view of the sieves, showing a drive system that moves the sieves back-and-forth;

FIG. 3 is an enlarged top view of a part of the sieves, showing the sieve vanes;

DETAILED DESCRIPTION OF THE INVENTION

Figure 1:
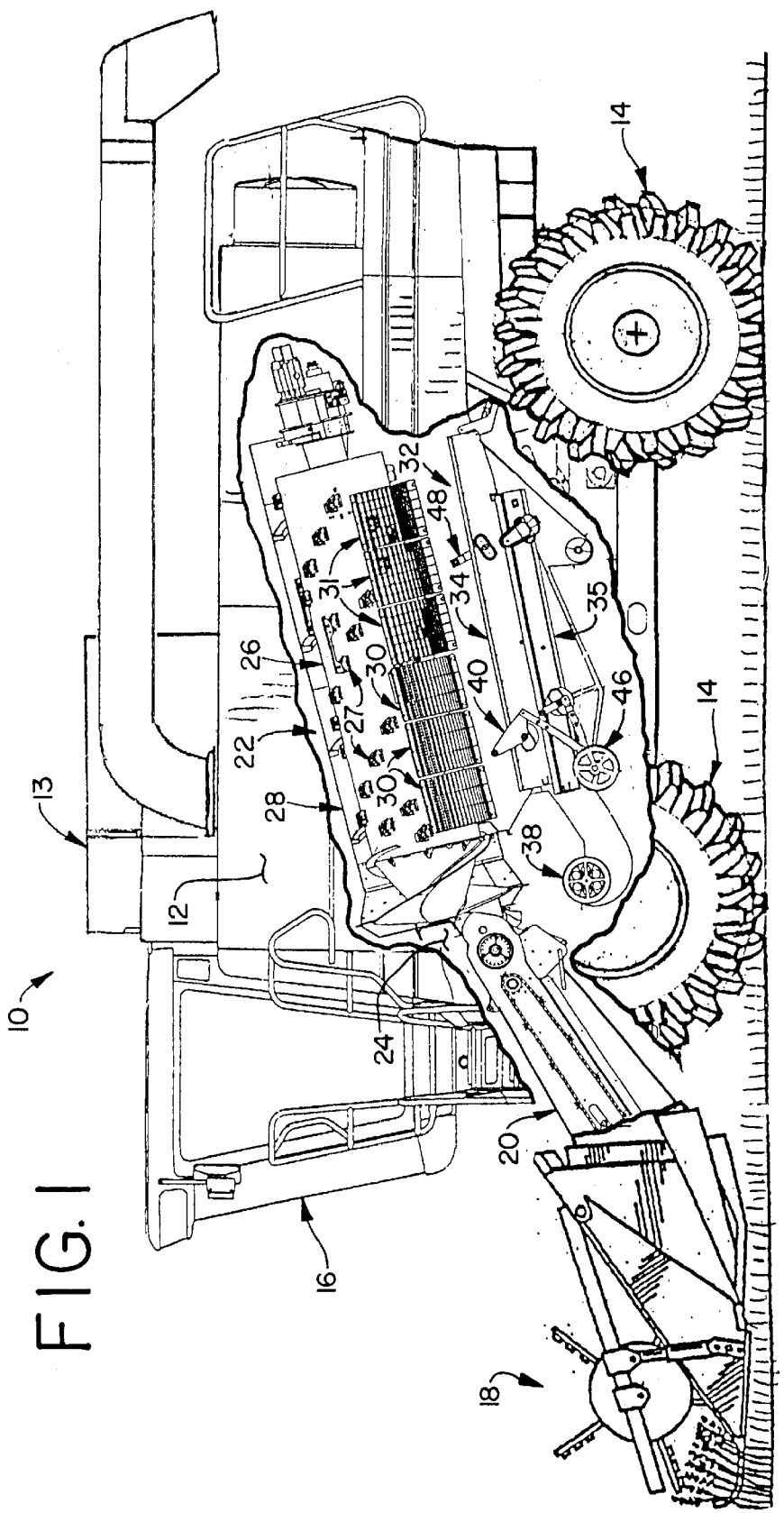
FIG. 1 is a side elevational view of an agricultural combine, showing part of the combine body broken away to illustrate the rotor assembly and the sieves.

Referring now to the drawings, there is shown a self-propelled agricultural combine 10. The combine 10 includes a body 12 supported by wheels 14 and an engine (not shown) for driving the wheels 14 to allow the combine 10 to move from place to place. An operator's station 16 is positioned towards the forward end of the combine body 12 and includes numerous controls to allow the operator to adjust the functions of the combine 10.

At the forward end of the combine 10 is a crop harvesting header 18 that severs and gathers the ripened crop materials from the crop field. After cutting the stems of the crop materials or collecting the crop materials from a prepared windrow, the crop materials are fed rearward through a feeder housing 20 to the threshing assembly 22.

Although a variety of threshing systems are known to those skilled in the art, a rotary threshing assembly 22 is herein described. In such a system, the crop materials are fed into the forward end of the rotor assembly 22. An impeller 24 is attached to the forward end of the rotor 26 to assist entrance of the crop materials. Spiral vanes 29 attached top side of the interior of the rotor housing 28 induce the crop materials to travel rearward through an annular space between the stationary rotor housing 28 and the rotating rotor 26. As the crop materials travel rearward, they are threshed by a series of rasp bars 27 or other threshing elements attached to the exterior of the rotor 26.

Along the bottom side of the rotor housing 28 is a concave 30 and a grate 31 which have perforated openings that allow grain and other fine materials to pass through and away from the rotor assembly 22. Larger materials, such as crop stalks, continue rearward through the rotor assembly 22 and are discharged out the rear end of the rotor assembly 22.

After falling through the concave 30 or the grate 31, the grain and other fine materials land on top of a series of sieves 32 located below the rotor assembly 22. Optionally, the crop materials will form a shallow mat on the sieves 32. The sieves 32 usually include a number of individual sieves 34, 35 that are positioned in a stacked pattern, with one sieve 35 located below the another 34. Although any number of sieves can be used, the described embodiment includes two individual sieves 34, 35.

Each of the sieves 32 includes a bed of vanes 33 which the grain can pass through. A cleaning fan 38 is also provided, which blows forced air up through the sieve vanes 33. The forced air prevents the lighter fine materials from passing through the vanes 33 and blows the fine materials away from the sieves 32 towards a rear discharge area. Usually the separation performance of the sieves 32 can be adjusted by rotating the vanes 33 between open and closed positions and by changing the speed of the cleaning fan 38. After the heavier grain passes through all of the individual sieves 32, the grain falls to the bottom of the combine body 12 and is augured up to an onboard storage bin 13.

In order to encourage separation of the grain and fine materials, the sieves 32 move in a constant, reciprocating motion, with each individual sieve 34, 35 usually moving in opposite directions to adjacent sieves 34, 35. This motion aids separation by introducing a jostling effect to the crop materials, which causes the heavier materials to sink down through the mat of crop materials. In addition, the tips of the vanes 33 point rearward so that as the fine materials rise to the top with the aid of the cleaning fan 38, the fine materials are pushed rearward towards the discharge area as the sieves 32 move back-and-forth.

Although the back-and forth motion of the sieves 32 can be accomplished in a variety of ways, the described embodiment includes pivoting support members 48 along the rear end of the sieves 32 and pivot members 40 and oscillation mechanisms 56 along the front of the sieves 32. The support members 48 support the weight of the rear end of the sieves 32 and allow the sieves 32 to move back-and-forth. Accordingly, the support members 48 are pivotally attached at one end to a sieve 34, 35 and are pivotally attached at the other end to the combine body 12 at a position above the sieve 34, 35. The weight of the front end of the sieves 32 is supported by the pivot members 40. Similarly, the pivot members 40 are pivotally attached to a sieve 34, 35 and pivotally attached to the combine body 12 at a position above the sieve 34, 35.

A connecting arm 42 is pivotally attached to each of the pivot members 40. The other end of the connecting arm 42 is attached to an oscillation mechanism 56 which provides the back-and-forth drive motion. The oscillation mechanism 56 includes an annular member 58 which is fixedly attached to the connecting arm 42. A ball bearing 60 is installed within the inner diameter of the annular member 58. Finally, a rotating member 62 is installed within the inner diameter of the ball bearing 60. The rotating member 62 is fixedly connected to the drive shaft 50 in an offset manner so that the axis of rotation of the drive shaft 50 is away from the geometric center of the rotating member 62. Therefore, as is now apparent, the sieve 34, 35 will travel through one entire back-and-forth cycle each time the drive shaft 50 is rotated one full rotation. To achieve opposite directional movements between the upper and lower sieves 34, 35, the rotating members 62 for the upper sieve 34 and the lower sieve 35 are connected to the drive shaft 50 at opposite, offset locations.

The drive shaft 50 of the present invention is driven by a hydraulic motor 52 instead of the belts and pulley systems of the prior art. This provides the advantage of eliminating the durability problems and complexity associated with belt drive systems. In addition, the hydraulic motor 52 can provide variable adjustments to the speed of the sieves 32. Preferably, a control is provided in the combine's operator station 16 that will allow the operator to change the speed of the hydraulic motor 52 and consequently the speed of the sieves 32 as desired.

Figure 4:
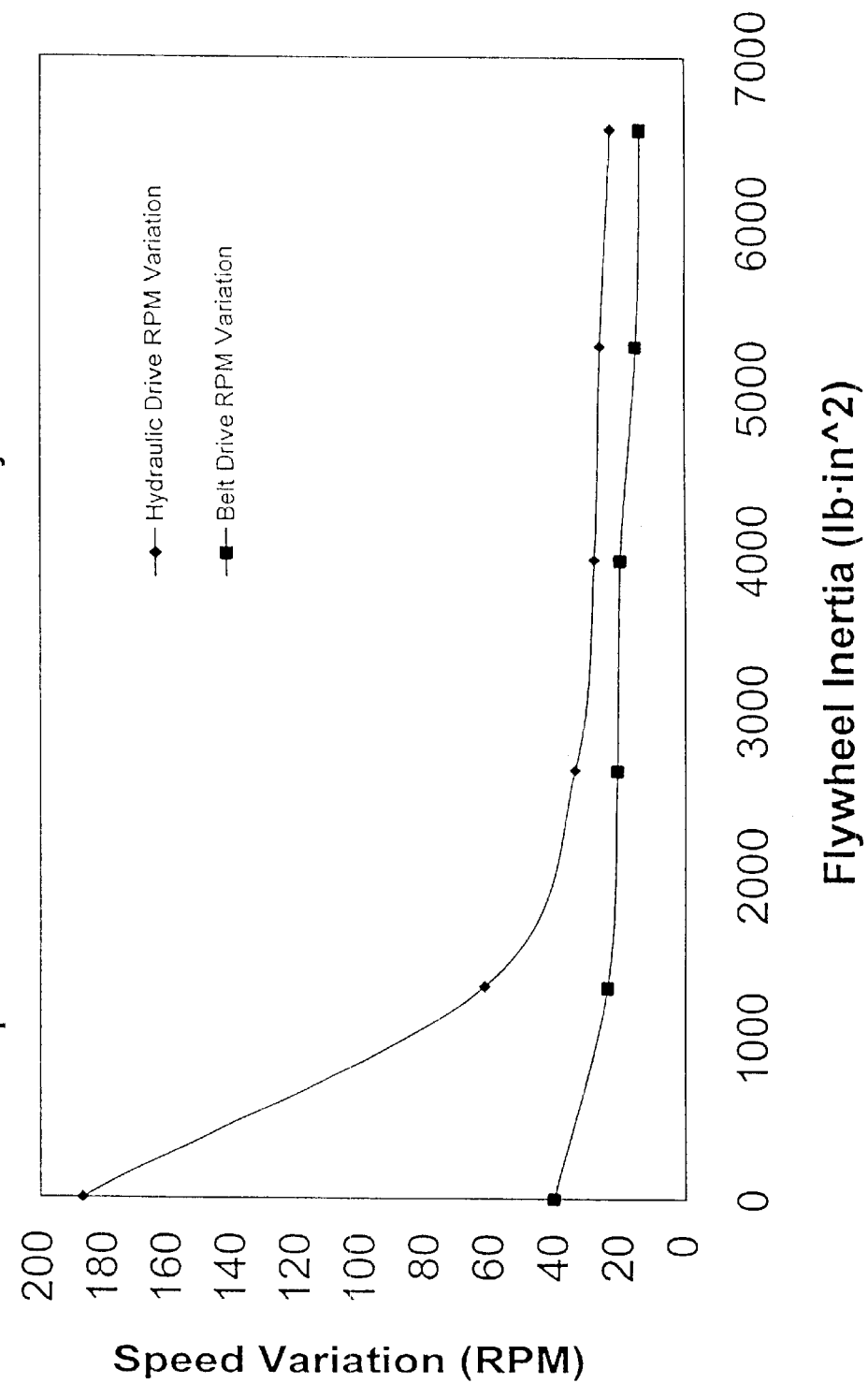
FIG. 4 is a chart, showing speed variations in the drive shaft when a belt drive system and when a direct drive hydraulic motor is used, each drive system being shown with varying amounts of flywheel inertia.
Figure 5:
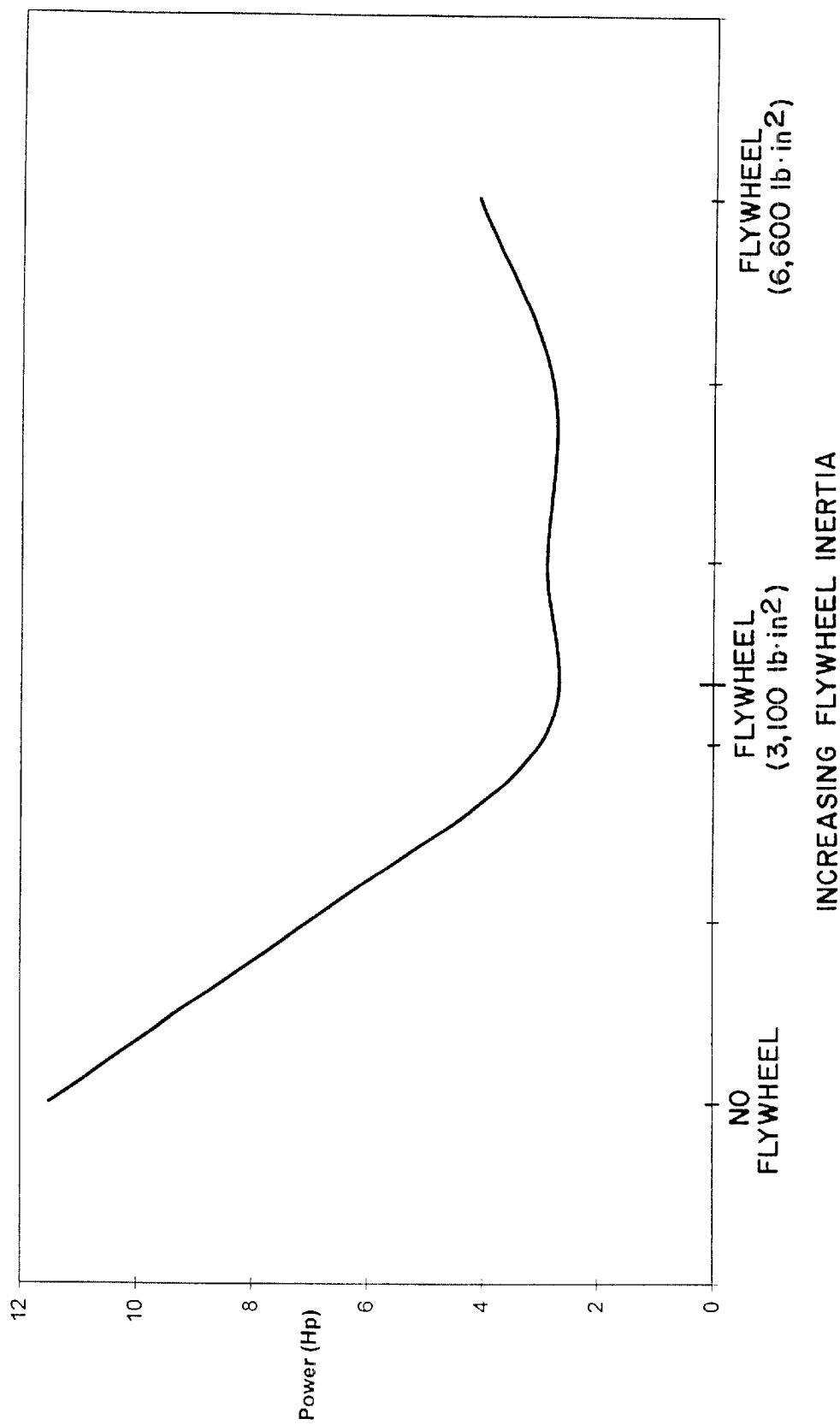
FIG. 5 is a chart, showing the drive power required for a direct drive hydraulic motor with varying amounts of flywheel inertia.

Some problems have been experienced in directly driving the sieves 32 with a hydraulic motor 52, however. Because the drive system of the sieves 32 is not connected to other rotating components through belts, the beneficial inertia that these other components provide no longer exists. This allows speed variations to occur in the drive shaft 50. These speed variations can ultimately result in damaging accelerations in the sieves 32, which results in failures of various sieve components due to fatigue. In one embodiment, the accelerations as shown in FIG. 4 have been known to exist. Over time, these types of repeated accelerations can cause the drive system pivot connections and various other components in the sieves 32, like the welded seams in the side frames 36, to fail.

A flywheel 46 is, therefore, provided in the present system. Although various types, sizes, and locations are possible for the flywheel 46, the preferred embodiment includes a flywheel 46 connected to the drive shaft 50. The flywheel 46 is located on the opposite side of the sieves 32 from the hydraulic motor 52.

Various sizes of flywheels 46 are possible to smooth out the torque variations by minimizing speed variations in the drive shaft 50, therefore minimizing accelerations in the sieves 32. Generally, larger flywheels 46 provide better dampening of the speed variations, but larger flywheels 46 can also place excessive loads on the hydraulic motor 52. In the preferred embodiment, a flywheel 46 with an inertia of about 3,100 lb-in$^2$ has been determined to adequately minimize accelerations while minimizing the additional load on the hydraulic motor 52. Flywheels 46 with other amounts of inertia can also be used to minimize accelerations in a hydraulic motor drive system, however. Preferably, the inertia of the flywheel 46 will be between 2000 lb-in$^2$ and 6000 lb-in$^2$ for a hydraulic drive system.

In addition to the hydraulic motor drive system discussed, the flywheel 46 of the invention can also be used with traditional belt drive systems to further minimize fatigue causing accelerations in those systems. Despite the beneficial flywheel effect that is inherent in belt driven systems, some drive shaft 50 speed variations still occur in these systems. Accordingly, by minimizing these drive shaft 50 speed variations, the resulting accelerations in the sieves 32 will be minimized and the fatigue life of the components will be improved. Flywheels 46 with various amounts of inertia will minimize accelerations in a belt drive system, with a flywheel inertia greater than 2000 lb-in$^2$ providing significant improvements. Preferably, the inertia of the flywheel 46 will be between 2000 lb-in$^2$ and 6000 lb-in$^2$ for a belt drive system.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

We claim:

1. A drive system for a reciprocating sieve in an agricultural combine, comprising:
   a) a power source and a drive linkage; and
   b) a flywheel connected to said drive linkage for minimizing accelerations in said sieve, said drive linkage includes an oscillation mechanism that moves said sieve in a reciprocating, back-and-forth motion said oscillation mechanism further includes:
      i) a connecting arm; and
      ii) a pivot member that is pivotally attached to said connecting arm and is pivotally attached to said sieve,
      iii) a rotating member that is attached in an offset manner to a drive shaft;
      iv) a ball bearing installed onto the outer diameter of said rotating member; and
      v) an annular member installed onto the outer diameter of said ball bearing, the annular member being attached to said connecting arm.

2. The drive system according to claim 1, wherein:
   a) said power source is a hydraulic motor that provides direct power to the sieve through a beltless linkage.

3. The drive system according to claim 2, wherein said flywheel has an inertia greater than 2000 lb-in$^2$.

4. The drive system according to claim 2, wherein said flywheel has an inertia between 2000 and 6000 lb-in$^2$.

5. The drive system according to claim 1, further comprising:
   a) a belt that provides power to the sieve through a pulley.

6. The drive system according to claim 5, wherein said flywheel has an inertia greater than 2000 lb-in$^2$.

7. The drive system according to claim 5, wherein said flywheel has an inertia between 2000 and 6000 lb-in$^2$.
   a) a hydraulic motor with a drive shaft; and
   b) an oscillation mechanism that is directly connected to said hydraulic motor drive shaft without the use of a belt.

* * * * *